United States Patent
Ahn

(10) Patent No.: US 9,093,730 B2
(45) Date of Patent: Jul. 28, 2015

(54) BATTERY PACK

(71) Applicant: SAMSUNG SDI CO., LTD., Yongin-si, Gyeonggi-do (KR)

(72) Inventor: Sang-Kyu Ahn, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 190 days.

(21) Appl. No.: 13/838,941

(22) Filed: Mar. 15, 2013

(65) Prior Publication Data

US 2014/0038007 A1     Feb. 6, 2014

(30) Foreign Application Priority Data

Aug. 2, 2012    (KR) .......................... 10-2012-0084781

(51) Int. Cl.
| | |
|---|---|
| H01M 10/60 | (2014.01) |
| H01M 10/617 | (2014.01) |
| H01M 2/10 | (2006.01) |
| H01M 10/42 | (2006.01) |
| H01M 10/48 | (2006.01) |
| H01M 10/6563 | (2014.01) |

(52) U.S. Cl.
CPC ........ *H01M 10/5008* (2013.01); *H01M 2/1077* (2013.01); *H01M 10/425* (2013.01); *H01M 10/482* (2013.01); *H01M 10/486* (2013.01); *H01M 10/5067* (2013.01); *H01M 2010/4271* (2013.01)

(58) Field of Classification Search
CPC ............ H01M 10/50; H01M 10/5008; H01M 10/5002; H01M 10/5018
USPC .......................................................... 429/120
See application file for complete search history.

(56) References Cited

U.S. PATENT DOCUMENTS

| | | | | |
|---|---|---|---|---|
| 5,934,079 | A * | 8/1999 | Han et al. .......................... | 62/3.2 |
| 6,164,369 | A * | 12/2000 | Stoller ..................... | 165/104.33 |
| 6,877,551 | B2 * | 4/2005 | Stoller ............................. | 165/47 |
| 2007/0072061 | A1 * | 3/2007 | Shimizu .......................... | 429/62 |

(Continued)

FOREIGN PATENT DOCUMENTS

| | | |
|---|---|---|
| JP | 2006-100123 | 4/2006 |
| JP | 2009-142071 A | 6/2009 |

(Continued)

OTHER PUBLICATIONS

Korean Office Action issued by Korean Patent Office on Nov. 15, 2013 corresponding to 10-2012-0084781 and Request for Entry of the Accompanying Office Action attached herewith.

(Continued)

*Primary Examiner* — Gregg Cantelmo
(74) *Attorney, Agent, or Firm* — Robert E. Bushnell, Esq.

(57) ABSTRACT

A battery pack includes a number of battery modules, a case, a circulation unit and a control unit. The case accommodates the plurality of battery modules therein. The circulation unit is positioned in the case so as to circulate heat generated from the plurality of battery modules. The control unit selects one or more of the number of battery modules and operates the circulation unit using power of the selected battery modules. Accordingly, the temperature equilibrium of the battery pack is implemented by conducting heat from a high-temperature battery module to a low-temperature battery module, so that it is possible to decrease the degree of deterioration and to extend the lifetime of the battery pack.

18 Claims, 6 Drawing Sheets

(56) References Cited

U.S. PATENT DOCUMENTS

2008/0076011 A1 3/2008 Emori et al.
2008/0247135 A1* 10/2008 Inoue et al. .................. 361/695
2008/0251246 A1* 10/2008 Ohkuma et al. ............. 165/287
2009/0102422 A1* 4/2009 Naganuma et al. .......... 320/118
2010/0089547 A1 4/2010 King et al.
2012/0032638 A1 2/2012 Jung

FOREIGN PATENT DOCUMENTS

| JP | 2009252730 A | * | 10/2009 |
| KR | 10-2002-0050633 | | 6/2002 |
| KR | 1020110048978 A | | 5/2011 |
| KR | 1020110092921 A | | 8/2011 |
| KR | 10-2011-0101458 | | 9/2011 |

OTHER PUBLICATIONS

Korean Notice of Allowance issued by Korean Patent Office on Apr. 17, 2014 corresponding to KR 10-2012-0084781 and Request for Entry of the Accompanying Office Action attached herewith.

* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on the 2 Aug. 2012 and there duly assigned Serial No. 10-2012-0084781.

BACKGROUND OF THE INVENTION

1. Field of the Invention

An aspect of the present invention generally relates to a battery pack.

2. Description of the Related Art

Recently, battery packs have been variously used as power sources of portable electronic devices. As the portable electronic devices are used in various fields, demands on battery packs are rapidly increased. The battery packs can be charged/discharged a plurality of times, and accordingly are economically and environmentally efficient. Thus, the use of the battery packs is encouraged.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments provide a battery pack which can decrease its degree of deterioration and extend its lifetime by decreasing the temperature variation between battery modules.

According to an aspect of the present invention, there is provided a battery pack including: a plurality of battery modules; a case that accommodates the plurality of battery modules therein; a circulation unit positioned in the case so as to circulate heat generated from the plurality of battery modules; and a control unit that selects one or more of the plurality of battery modules and operates the circulation unit using power of the selected battery modules.

The control unit may select battery modules in order of the battery module having a higher state of charge (SOC) value among the plurality of battery modules.

The battery pack may further include an SOC measuring unit that measures an SOC value of each battery module and provides the measured SOC value to the control unit; and a switching unit that connects the plurality of battery modules to the circulation unit. The control unit may turn on the switching unit connected from the selected battery modules.

The control unit may select battery modules in order of the battery module having a higher voltage among the plurality of battery modules.

The battery pack may further include a voltage measuring unit that measures a voltage of each battery module and provides the measured voltage to the control unit; and a switching unit that connects the plurality of battery modules to the circulation unit. The control unit may turn on the switching unit connected from the selected battery modules.

The circulation unit may equalize a temperature variation between the plurality of battery modules by circulating the heat.

The case may include a case main body and a door that opens/closes the case main body, and the circulation unit may be positioned at the door.

The control unit may operate the circulation unit when the temperature difference between the battery modules is a predetermined range or more.

The circulation unit may include an inlet through which air is flowed in the circulation unit, and an outlet through which the air flowed in the circulation unit is exhausted.

The case may include a case main body and a door that opens/closes the case main body, and the outlet may exhaust the air in a direction parallel with the door.

The control unit may adjust the size of the outlet.

The circulation unit may further include a duct portion extended from the outlet.

The circulation unit may be a centrifugal fan.

The inlet may be positioned opposite to the battery module.

The battery pack may further include a temperature measuring unit that measures a temperature in the case.

The case may be sealed so as to prevent the air from being circulated between the inside and outside of the case.

These and other features and advantages of the present invention will be set forth or will become more fully apparent in the description that follows.

Prior to the foregoing, terms and words used in this specification or claims shall not be interpreted as typical or dictionary meanings, but shall be interpreted as meanings and concepts complying with the technical spirit of the present invention in accordance with the principle that the inventor may properly define the concept of the terms to explain his/her invention by the best method.

According to the battery pack of the present invention, the circulation unit conducts heat from a high-temperature battery module to a low-temperature battery module, so that it is possible to implement the temperature equilibrium between a plurality of battery modules. Also, the temperature equilibrium of the battery pack is implemented, so that it is possible to decrease the degree of deterioration and to extend the lifetime of the battery pack.

Further, the control unit selects a battery module having a high SOC value or voltage and operates the circulation unit using power of the selected battery module, so that it is decrease the variation in SOC value or voltage between the battery modules. Accordingly, the lifetime of the battery pack can be further extended by decreasing the degree of deterioration of the battery pack.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
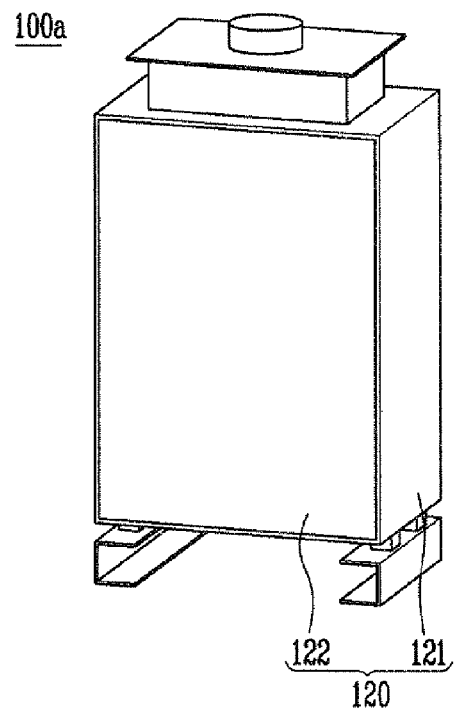
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, like reference numerals refer to like elements.

Often, a large-capacity battery pack may include a number of battery modules therein. In a case where the battery pack is large sized, a temperature variation between the battery modules in the battery pack occurs, and accordingly, the degree of deterioration according to the temperature variation and the decrease of lifetime occur.

Hereinafter, exemplary embodiments of the present invention will be described in detail with reference to the accompanying drawings.

Figure 2:
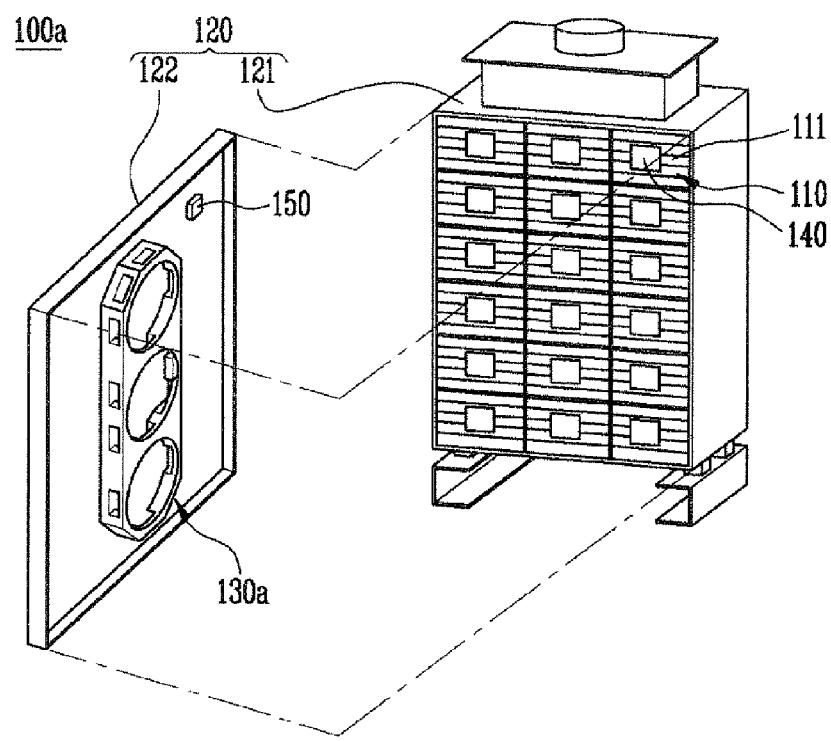
FIG. 2 is an exploded perspective view of the battery pack shown in FIG. 1.

FIG. 1 is a perspective view of a battery pack 100a according to an embodiment of the present invention. FIG. 2 is an exploded perspective view of the battery pack 100a shown in FIG. 1. Hereinafter, the battery pack 100a according to this embodiment will be described with reference to FIGS. 1 and 2.

As shown in FIGS. 1 and 2, the battery pack 100a according to this embodiment includes a plurality of battery modules 110, a case 120 that accommodates the battery modules 110 therein, a circulation unit 130a positioned in the case 120 so as to circulate heat, and a control unit 150 that selects some of the battery modules 110. The battery modules 110 selected by the control unit 150 may be used as a power source that operates the circulation unit 130a.

The battery module 110 is a member that generates electrochemical energy through the movement of ions or electrons, and the plurality of battery modules 110 may be arranged in the case 120.

Here, the battery modules 110 may be arranged while forming rows and columns in the case 120. Each battery module 110 may include a plurality of stacked battery cells 111, and each battery cell 111 may include a positive electrode plate, a negative electrode plate and a separator interposed between the positive and negative electrode plates. The battery module 110 may have a protective circuit module provided to each battery cell 111 or a protective circuit module integrally connected to several battery cells 111. The protective circuit module may control voltage or current in charging/discharging of the battery cell 111. An electrode tab may be extracted from each battery cell 111, and an electrode assembly may be of all known types such as a stacking type and a winding type.

Meanwhile, in a case where the battery pack 100a according to this embodiment is implemented as a large-capacity battery pack, the battery modules 110 may be installed under the ground in the state in which the battery modules 110 are arranged in the case 120.

The case 120 is a member that accommodates the battery modules 110 therein, and may include a case main body 121 and a door 122.

Here, the case main body 121 may be formed in the shape of a box having an opened side so as to accommodate the battery modules 110 therein, and the door 122 may open/close the opened side of the case main body 121. Thus, in a case where the door 122 is closed with respect to the case main body 121, the inside of the case 120 can be protected from an external environment. In addition, the inside of the case 120 may be sealed hermetically so that air in the case 120 cannot be exchanged with the outside of the case 120. That is, the case 120 can prevent the air in the case 120 from being circulated to the outside of the case 120.

Figure 3:
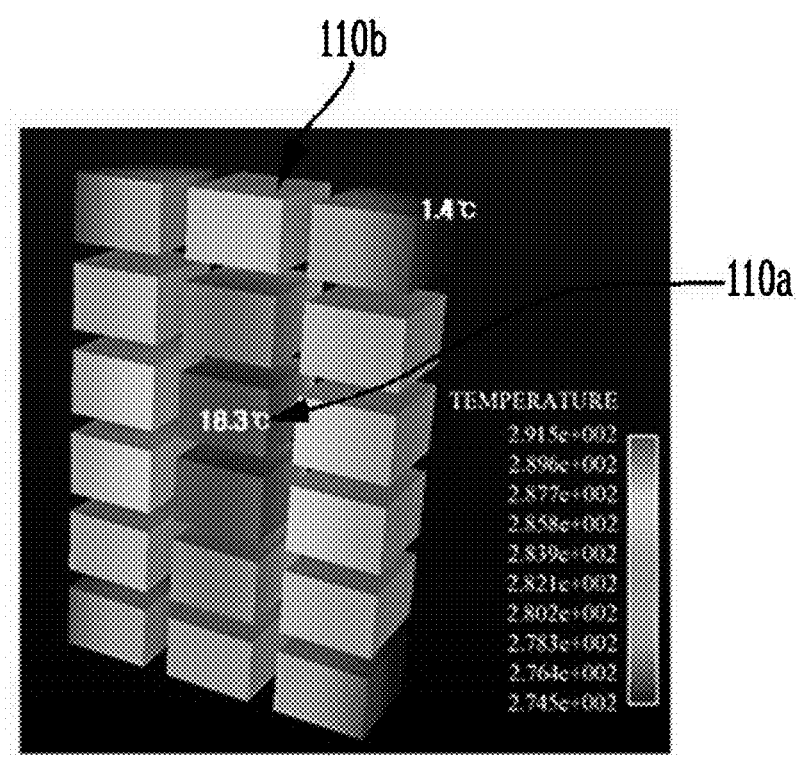
FIG. 3 is a view showing a temperature distribution of a battery module when a circulation unit of the battery pack shown in FIG. 1 is not operated.
Figure 4:
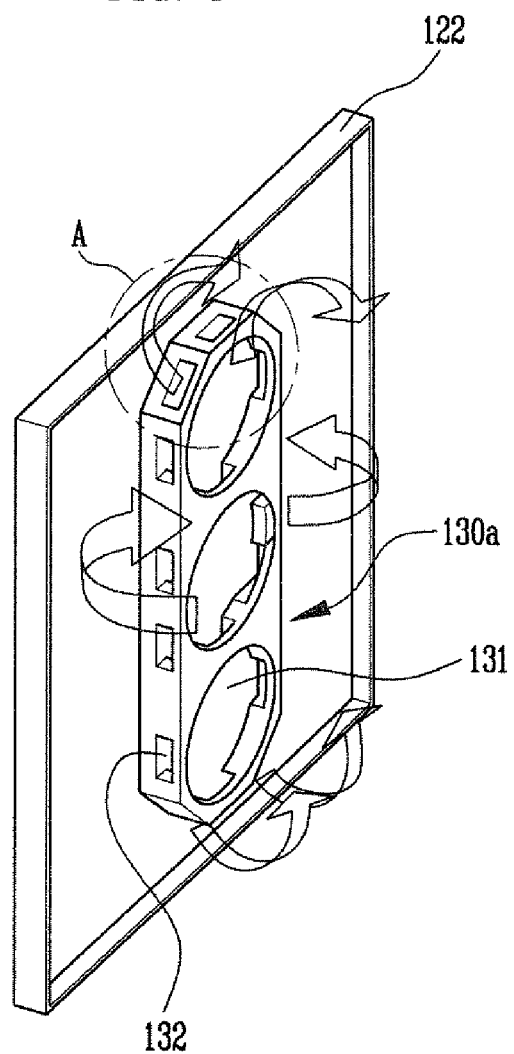
FIG. 4 is a perspective view illustrating the circulation unit of the battery pack shown in FIG. 1.
Figure 5:
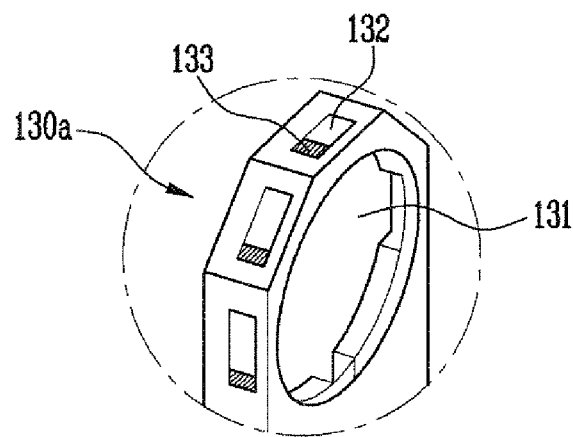
FIGS. 5 and 6 are enlarged views showing portion 'A' shown in FIG. 4.
Figure 6:
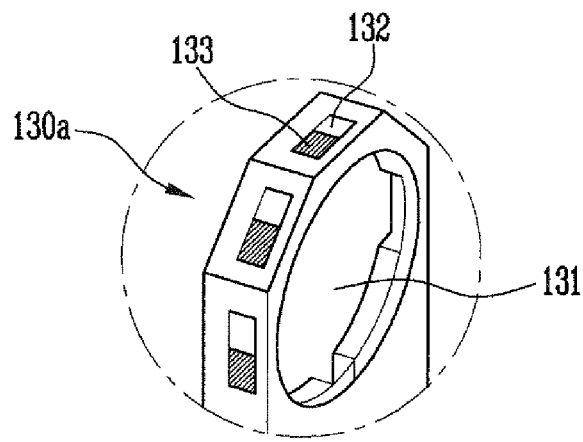

FIG. 3 is a view showing a temperature distribution of the battery module 110 when a circulation unit 130a of the battery pack 100a shown in FIG. 1 is not operated. FIG. 4 is a perspective view illustrating the circulation unit 130a of the battery pack 100a shown in FIG. 1. FIGS. 5 and 6 are enlarged views showing portion 'A' shown in FIG. 4. Hereinafter, the circulation unit 130a according to this embodiment will be described with reference to FIGS. 3 to 6.

As shown in FIG. 3, a battery module 110b at an edge portion is further influenced by the external environment, and therefore, the battery module 110b may have a low temperature. On the other hand, a battery module 110a at a central portion may be surrounded by other battery modules 110, and therefore, the battery module 110a may have a high temperature. In a case where the temperature of the battery module 110a at the central portion is increased to a predetermined range or more, the battery module 110 may be deteriorated, and accordingly, the lifetime of the battery module 110 may be shortened. In a case where the temperature of the battery module 110b at the edge portion may be decreased to a predetermined range or more, the lifetime of the battery module 110 may also be shortened. After installing the battery pack 100a under the ground and then leaving the battery pack along under an atmosphere of about −20° C. for 24 hours, the inventor of the present invention performed a charging/discharging test on the battery pack 100a. As a result, the inventor of the present invention has identified that the temperature of the battery module 110a at the central portion was 18.3° C. and the temperature of the battery module 110b at the edge portion was 1.4° C., which the difference in temperature between the battery modules was about 17° C. In a case where a large difference in temperature between the battery modules 110 in the one battery pack 100a occurs as described above, the state of charge (SOC) variation between the battery modules 110 is increased, and therefore, the degree of deterioration is also increased. Accordingly, the entire lifetime of the battery pack 100a may be shortened.

However, the battery pack 100a according to the present invention has the circulation unit 130a as shown in FIG. 4, and thus it is possible to prevent the lifetime of the battery pack 100a from being shortened. Specifically, the circulation unit 130a may be positioned at the door 122 of the case 120, and may conduct the heat of the battery module 110a at the central portion, which has a high temperature, to the battery module 110b at the edge portion, which has a low temperature. Here, the circulation unit 130a may include an inlet 131 through which air is flowed in the circulation unit 130a, and an outlet 132 through which the air flowed in the circulation unit 130a may be exhausted to the outside of the circulation unit 130a. In this case, the inlet 131 may be positioned opposite to the battery module 110, particularly the battery module 110a at the central portion, and the outlet 132 may be positioned vertical to the inlet 131 so that the air may be exhausted in a direction parallel with the door 122. Thus, the circulation unit 130a allows the heat of the battery module 110a at the central portion together with the air to be flowed therein through the inlet 131, and allows the heat and the air to be conducted to the battery module 110b at the edge portion through the outlet 132, so that it is possible to implement the temperature equilibrium of the battery pack 100a. In this case, the high-temperature air exhausted through the outlet 131 may be conducted to the battery module 110b at the edge portion along a flow path parallel with the door 122.

Meanwhile, as shown in FIGS. 5 and 6, the outlet 132 may be implemented so that the size of the outlet 132 may be adjusted. For example, an adjusting plate 133 may be movably provided to the outlet 132, and may be implemented to block a portion of the outlet 132. Thus, the size of the outlet 132 can be adjusted. Specifically, in a case where the temperature variation between the battery modules 110 may be large, as shown in FIG. 5, the size of the outlet 132 may be increased by moving the adjusting plate 133 in one direction, so that the amount of the circulated air can be increased, thereby more rapidly implementing the temperature equilibrium of the battery pack 100a. In a case where the temperature variation between the battery modules 110 is relatively small, as shown in FIG. 6, the size of the outlet 132 can be decreased by moving the adjusting plate in the opposite direction, and accordingly, the amount of the circulated air can be decreased. Thus, it is possible to prevent power from being wasted by increasing the size of the outlet 132 to be larger than a required amount. The movement of the adjusting plate 133 may be controlled by the control unit 150 which will be described later.

For example, a centrifugal fan such as a sirocco fan may be used to decrease the thickness of the circulation unit 130a and to implement the outlet 131 to be vertical to the outlet 132.

Figure 7:
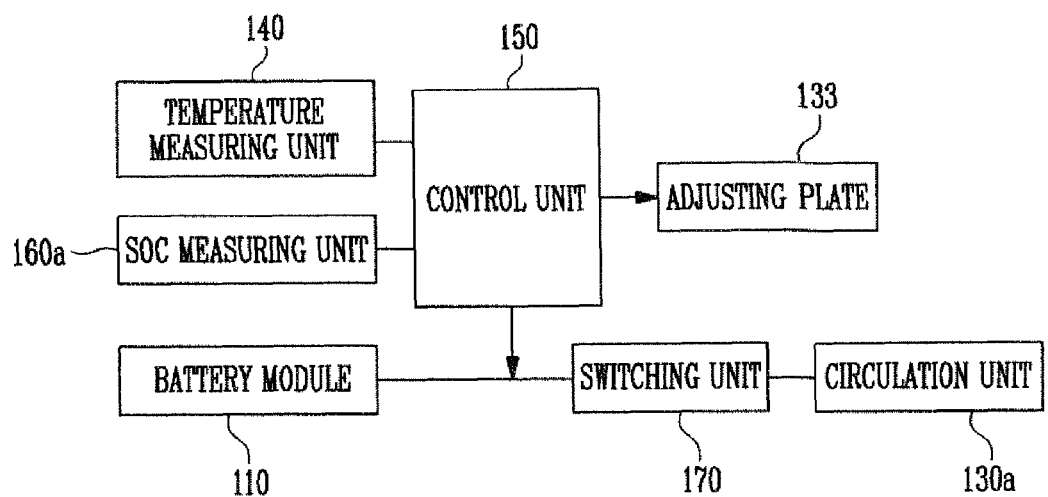
FIG. 7 is a block diagram illustrating a temperature measuring unit and a control unit in the battery pack shown in FIG. 1.

FIG. 7 is a block diagram illustrating the temperature measuring unit 140 and the control unit 150 in the battery pack 100a shown in FIG. 1. Hereinafter, the temperature measuring unit 140 and the control unit 150 according to this embodiment will be described with FIG. 7.

As shown in FIGS. 2 and 7, the temperature measuring unit 140 may be a member that may be installed in the case 120 so as to measure an internal temperature distribution of the case 120.

Here, the temperature measuring unit 140 may be provided with a plurality of temperature measuring units. For example, the temperature measuring unit 140 is provided to each battery module 110 so that the internal temperature distribution of the case 120 can be three-dimensionally measured. The control unit 150 can receive a temperature measured by the temperature measuring unit 140 so as to detect the internal temperature distribution of the case 120. Specifically, the control unit 150 can detect a temperature measured by the temperature measuring unit 140 adjacent to the battery module 110a at the central portion and a temperature measured by the temperature measuring unit 140 adjacent to the battery module 110b at the edge portion. The control unit 150 can compute the internal temperature variation of the case using the detected temperatures.

Meanwhile, the circulation unit 130a is necessarily operated in order to implement the temperature equilibrium described above. In this case, the battery pack 100a according to this embodiment may use the battery module 110 in the case 120 as a power source for operating the circulation unit 130a. The battery module 110 used as the power source may be selected by the control unit 150.

Specifically, the control unit 150 selects one or more battery modules 110 in order of the battery module 110 having a higher SOC value among the plurality of the battery modules 110, and may operate the circulation unit 130a using the power of the selected battery module 110. That is, the control unit 150 may select, for example, one, two or more battery modules 110 in the order of the battery module 110 having a higher SOC value among the plurality of the battery modules 110. Thus, the control unit 150 uses remaining power of the battery module 110 having a high SOC value, so that the total SOC value of the battery pack 100a can be equalized. Accordingly, the battery pack 100a may be operated in an optimal state, and the degree of deterioration may be lowered, thereby extending the lifetime of the battery pack 100a.

Particularly, in the conventional battery pack, the optimization of the battery pack was implemented by constituting a separate discharging circuit so as to set the SOC values of the plurality of battery modules to be constant. In this case, cost was spent in the constitution of the separate discharging circuit, and power was wasted as the battery modules were discharged. However, the battery pack 100a according to this embodiment uses power of the battery module having a high SOC value, which has been selected by the control unit 150, so that it is possible to equalize the SOC values of the battery modules 110 in the battery pack 100a. Further, the circulation unit 130a is operated using the remaining power of the battery module 110 having a high SOC value, so that it is possible to implement the temperature equilibrium in the case 120. Accordingly, cost can be remarkably reduced.

Meanwhile, the battery pack 100a according to this embodiment may further include an SOC measuring unit 160a and a switching unit 170 so that the control unit 150 can implement the function described above. Here, the SOC measuring unit 160a may be provided to each battery module 110, and the switching unit 170 may be implemented to connect each battery module 110 to the circulation unit 130a. Thus, the control unit 150 detects an SOC value of each battery module 110, measured by the SOC measuring unit 160a, selects a battery module 110 having a high SOC value among the plurality of battery modules 110, and controls only the switching unit 170 connected to the selected battery module 110 to be turned on, so that the circulation unit 130a can be operated using the remaining power of the selected battery module 110. In this case, the SOC measuring unit 160a can derive an objective SOC value of the battery module 110 by measuring, for example, the voltage, current and temperature of each battery module 110 and synthetically computing them.

Meanwhile, a method of selecting the number of battery modules in advance may be used as the method in which the control unit 150 selects the battery module 110 having a high SOC value. For example, in a case where it is determined in advance that the control unit 150 selects one battery module 110 having the highest SOC value, the control unit 150 may select the battery module 110 having the highest SOC value measured by the SOC measuring unit 160a. Alternatively, it is not determined in advance that the control unit 150 selects the number of battery modules 110, but may be determined that the control unit 150 selects the battery module 100 having a certain SOC value. Specifically, the control unit 150 may compute an average of SOC values measured by the SOC measuring unit 160a and select only the battery module 110 having an SOC value greater than the value obtained by multiplying the average by a predetermined value (e.g., 0.9).

As described in FIGS. 5 and 6, the control unit 150 may adjust the size of the outlet 132 by moving the adjusting plate 133. Specifically, in a case where the temperature variation measured by the temperature measuring unit 140 may be large, the control unit 150 may increase the size of the outlet 132 by moving the adjusting plate 133 in one direction. In a case where the temperature variation measured by the temperature measuring unit 140 may be small, the control unit 150 may decrease the size of the outlet 132 by moving the adjusting plate 133 in the opposite direction. Accordingly, it is possible to efficiently implement the temperature equilibrium of the battery pack 100a without loss of power consumption.

The control unit 150 may be separately provided to the battery pack 100a. Alternatively, the control unit 150 may be incorporated into a battery management system (BMS) of the battery pack 100a.

Meanwhile, the control unit 150 does not always operate the circulation unit 130a but may operate the circulation unit 130a only when a certain condition is satisfied.

Specifically, in a case where the variation between the temperature values measured by the temperature measuring unit 140 is a predetermined range or more, the control unit 150 may operate the circulation unit 130a. In a case where the variation between the temperature values does not exist or is small, it may be unnecessary to operate the circulation unit 130a. For example, in a case where the difference between the temperatures respectively measured by the temperature measuring unit 140 adjacent to the battery module 110a at the central portion and the temperature measuring member 140 adjacent to the battery module 110b at the edge portion is 10° C. or more, the control unit 150 may operate the circulation unit 130a.

Figure 8:
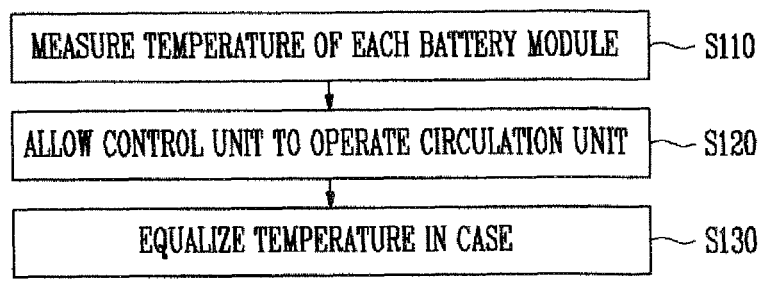
FIG. 8 is a flowchart illustrating an operating process of the battery pack shown in FIG. 1.

FIG. 8 is a flowchart illustrating an operating process of the battery pack 100a shown in FIG. 1. Hereinafter, the operating process of the battery pack 100a according to this embodiment will be described with reference to FIG. 8.

First, the temperature measuring unit 140 adjacent to each battery module 110 measures a temperature of the battery cell 110 (S110).

Next, in a case where the difference between the maximum and minimum temperatures among the temperatures measured by the respective temperature measuring units 140 is a predetermined range or more, the control unit 150 operates the circulation unit 130a (S120). In this case, the control unit 150 may select some of the battery modules 110 in order of the battery module 110 having a higher SOC value and operate the circulation unit 130a using power of the selected battery modules 110. Thus, it is possible to decrease the variation between SOC values in the battery pack 100a. Further, the control unit 150 can control the amount of air and heat flowed by the circulation unit 130a.

Next, if the circulation unit 130a is operated, the heat is conducted from the high-temperature battery module 110 to the low-temperature battery module 110, thereby equalizing the internal temperature of the case 120 (S130). Thus, it is possible to decrease the degree of deterioration of the battery module 110 and to increase the lifetime of the battery pack 100a.

Figure 9:
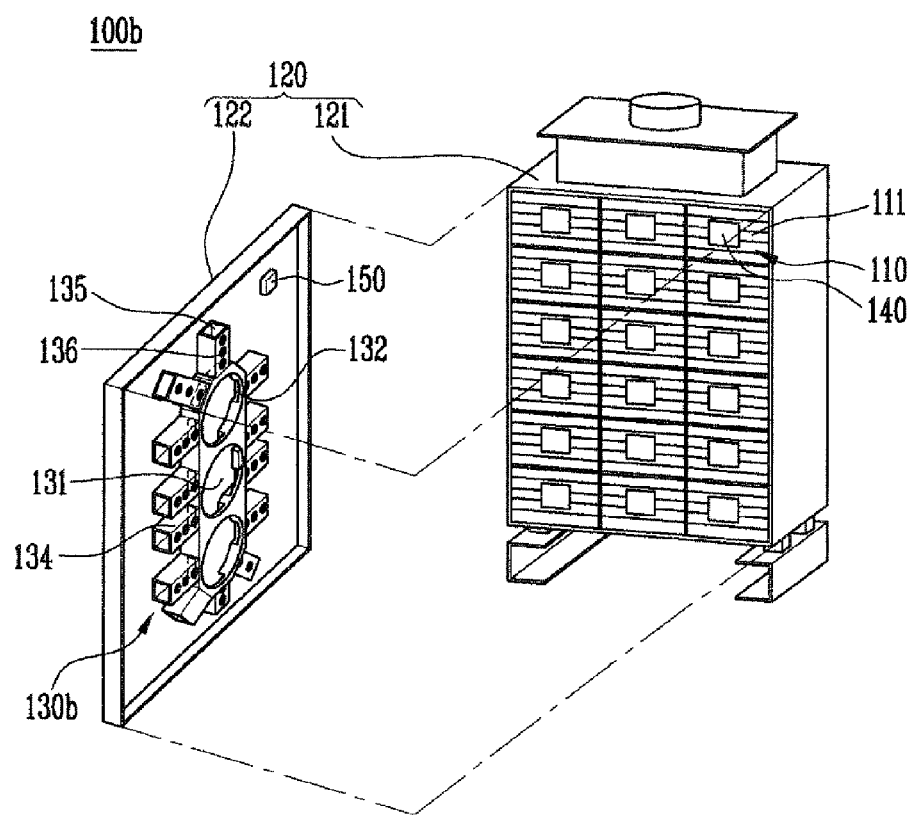
FIG. 9 is an exploded perspective view of a battery pack according to another embodiment of the present invention.
Figure 10:
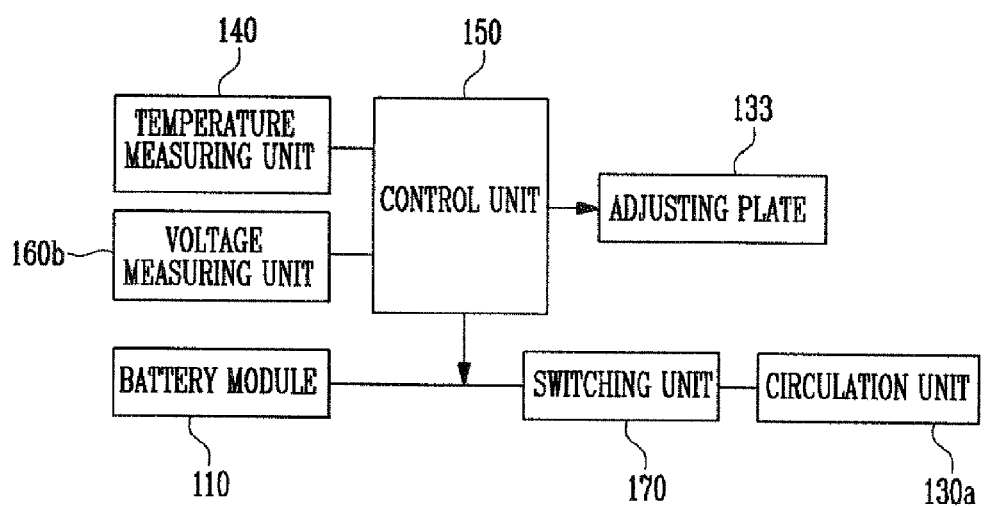
FIG. 10 is a block diagram illustrating a control unit of the battery pack shown in FIG. 9.

FIG. 9 is an exploded perspective view of a battery pack 100b according to another embodiment of the present invention. FIG. 10 is a block diagram illustrating a control unit 150 of the battery pack 100a shown in FIG. 9. Hereinafter, the battery pack 100b according to this embodiment will be described with reference to FIGS. 9 and 10. Here, components identical or corresponding to those of the aforementioned embodiments are designated by like reference numerals, and their descriptions will be omitted to avoid redundancy.

When comparing the battery pack 100b according to this embodiment with the battery pack 100a according to the aforementioned embodiment, a duct portion 134 is further provided to a circulation unit 130*b*, and the control unit 150 selects the battery module 110 having a high voltage.

Specifically, the circulation unit 130*b* according to this embodiment may include an inlet 131 through which air is flowed in the circulation unit 130*b*, an outlet 132 through which the air flowed in the circulation unit 130*b* is exhausted to the outside of the circulation unit 130*b*, and a duct portion 134 extended from the outlet 132.

Here, the duct portion 134 is extended from the outlet 132 so that the air exhausted through the outlet 132 can be easily moved at a further distance. For example, the duct portion 134 is extended until an end of the duct portion 143 is adjacent to the outermost edge of the case 120, so that heat at the central portion can be easily conducted to the edge portion. In order to implement the temperature equilibrium of the battery pack 100*b*, the duct portion 134 is preferably implemented so that the end of the duct portion 134 is positioned at the battery module 110 having a relatively low temperature by experimentally measuring a temperature of each battery module 110 in advance. The duct portion 134 is not necessarily implemented in parallel with the door 122. That is, the duct portion 134 may be bent in a certain direction so that heat is equally conducted. An opening 135 is not formed at only the end of the duct portion 134, but a plurality of holes 136 are also formed between the front and end of the duct portion 134 so that the heat at the central portion can be equally conducted in the case 20.

Meanwhile, the control unit 150 according to this embodiment may select the battery module 110 having a relatively high voltage using power for operating the circulation unit 130*b*.

In a case where the battery pack 100*b* is used while being continuously charged/discharged, the voltage imbalance of each battery module 110 may occur. For example, the battery module 110 positioned at the central portion is further deteriorated due to its relatively high temperature, so that the voltage of the battery module 110 positioned at the central portion can be lower than other battery modules 110. In a case where the variation in voltage between the battery modules 110 occurs as described above, the degree of deterioration of the battery pack 100*b* is further increased, and therefore, the lifetime of the battery pack 100*b* may be shortened.

In order to prevent such a phenomenon, the control unit 150 according to this embodiment may operate the circulation unit 130*b* using power of the battery module 110 having a relatively high voltage so as to decrease the variation in voltage between the battery modules 110. For example, the control unit 150 may select one or more battery modules 110 in order of the battery module 110 having a higher voltage among the battery modules 110 and operate the circulation unit 130*b* using power of the selected battery module 110.

Meanwhile, the battery pack 100*b* according to this embodiment may further include a voltage measuring unit 160*b* and a switching unit 170. Accordingly, power can be provided to the circulation unit 130*b* by turning on the switching unit 170 connected from the battery module 110 having a high voltage measured by the voltage measuring unit 160*b*. Like the aforementioned embodiment, a method of selecting the number of battery modules or selecting the battery module having a predetermined value or more may be used as the method in which the control unit 150 selects the battery module 110.

Meanwhile, although it has been described in the present invention that the temperature, SOC and voltage of each battery module 110 are measured, the present invention is not limited thereto. That is, the temperature, SOC and voltage of each battery cell 111 constituting the battery module 110 may be measured and controlled.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
   a plurality of battery modules;
   a case that accommodates the plurality of battery modules therein;
   a circulation unit positioned in the case so as to circulate heat generated from the plurality of battery modules; and
   a control unit that selects one or more of the plurality of battery modules and operates the circulation unit using power of the selected battery modules, the circulation unit has an inlet through which air flows into the circulation unit, and an outlet through which the air flowing in the circulation unit is exhausted,
   wherein the control unit adjusts the size of the outlet.

2. The battery pack according to claim 1, wherein the control unit selects battery modules in order of the battery module having a higher state of charge (SOC) value among the plurality of battery modules.

3. The battery pack according to claim 2, further comprising:
   an SOC measuring unit that measures an SOC value of each battery module and provides the measured SOC value to the control unit; and
   a switching unit that connects the plurality of battery modules to the circulation unit,
   wherein the control unit turns on the switching unit connected from the selected battery modules.

4. The battery pack according to claim 1, further comprising:
   a voltage measuring unit that measures a voltage of each battery module and provides the measured voltage to the control unit,
   wherein the control unit selects battery modules in order of the battery module having a higher voltage among the plurality of battery modules as measured by the voltage measuring unit.

5. The battery pack according to claim 4, further comprising:
   a switching unit that connects the plurality of battery modules to the circulation unit,
   wherein the control unit turns on the switching unit connected from the selected battery modules.

6. The battery pack according to claim 1, further comprising:
   a temperature measuring unit to measure a temperature of each battery module of the plurality of battery modules in the case,
   wherein the circulation unit equalizes a temperature variation between the plurality of battery modules by circulating the heat.

7. The battery pack according to claim 1, wherein the case comprises a case main body and a door that opens/closes the case main body, and the circulation unit is positioned at the door.

8. The battery pack according to claim 1, further comprising:
- a temperature measuring unit to measure a temperature of each battery module of the plurality of battery modules in the case,
- wherein the control unit operates the circulation unit when a temperature difference between the battery modules is a predetermined range or more.

9. The battery pack according to claim 1, wherein the case comprises a case main body and a door that opens/closes the case main body, and the outlet exhausts the air in a direction parallel with the door.

10. The battery pack according to claim 1, wherein the circulation unit further comprises a duct portion extended from the outlet.

11. The battery pack according to claim 1, wherein the circulation unit is a centrifugal fan.

12. The battery pack according to claim 1, wherein the inlet is positioned opposite to the battery module.

13. The battery pack according to claim 1, further comprising a temperature measuring unit that measures a temperature in the case.

14. The battery pack according to claim 1, wherein the case is sealed so as to prevent air from being circulated between the inside and outside of the case.

15. The battery pack according to claim 1, wherein
- the inlet is at least one inlet through into which air flows from the plurality of battery modules into the circulation unit; and
- the outlet is a plurality of outlets through which the air is dispersed throughout the case.

16. The battery pack according to claim 15, wherein the control unit senses a temperature difference among the plurality of battery modules housed within the case using a temperature measuring unit.

17. The battery pack according to claim 16, wherein the case is hermetically sealed.

18. The battery pack according to claim 17, wherein the size of the plurality of outlets is increased by the control unit when the temperature difference exceeds a predetermined value and decreased by the control unit when the temperature difference is below the predetermined value.

* * * * *